(12) United States Patent
Mennes et al.

(10) Patent No.: US 9,705,358 B2
(45) Date of Patent: Jul. 11, 2017

(54) PANEL BOARD EMERGENCY LIGHTING SYSTEM

(71) Applicant: Siemens Industry, Inc., Alpharetta, GA (US)

(72) Inventors: Michael J. Mennes, Altadena, CA (US); Ronnie H. Ridgeway, Arlington, TX (US); David A. Bradley, Mars, PA (US); Kevin S. Koder, Cumming, GA (US); William O. Scoggins, Jr., Donalds, SC (US); Seshagiri R. Marellapudi, Norcross, GA (US); Jeffrey D. Lord, Suwanee, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 15/358,264

(22) Filed: Nov. 22, 2016

(65) Prior Publication Data
US 2017/0077745 A1  Mar. 16, 2017

Related U.S. Application Data

(63) Continuation of application No. 12/399,052, filed on Mar. 6, 2009, now abandoned.

(60) Provisional application No. 61/099,238, filed on Sep. 23, 2008.

(51) Int. Cl.
| | |
|---|---|
| *H02B 1/20* | (2006.01) |
| *H02B 1/21* | (2006.01) |
| *H02J 9/00* | (2006.01) |
| *H02J 9/02* | (2006.01) |
| *H01H 89/06* | (2006.01) |

(52) U.S. Cl.
CPC ............. *H02J 9/02* (2013.01); *H01H 89/06* (2013.01); *H01H 2300/03* (2013.01); *Y02B 70/3241* (2013.01); *Y02B 90/224* (2013.01); *Y04S 20/14* (2013.01); *Y04S 20/227* (2013.01)

(58) Field of Classification Search
CPC ....... H01H 2300/03; H01H 89/06; H02J 9/00; H02J 9/02; H02J 2003/001; H02B 1/20; H02B 1/21; H02B 1/22
USPC .... 361/115, 47, 627, 644, 114, 634; 315/90, 315/120, 130, 137, 139
See application file for complete search history.

(56) References Cited

U.S. PATENT DOCUMENTS

2005/0248896 A1* 11/2005 Bowman ................ G01R 15/14
                                                                361/115

* cited by examiner

*Primary Examiner* — Jimmy Vu
*Assistant Examiner* — Henry Luong (57) ABSTRACT

An emergency lighting system includes an electrical panel board having a phase layout that includes consecutively arranged phases wherein one or more pairs of consecutively arranged phases are of the same phase. A 2-pole branch circuit breaker may be electrically connected to a consecutive pair of same phases, and a 1-pole remotely-operated-relay may be electrically connected to one pole of the 2-pole branch circuit breaker. The emergency lighting system may further include an emergency lighting fixture having a normal power input and an emergency power input. The normal power input may be electrically connected to the 1-pole remotely-operated-relay such that the normal power input is connected to one phase, and the emergency power input may be electrically connected to the 2-pole branch circuit breaker such that the emergency power input is electrically connected to a consecutive pair of same phases.

20 Claims, 5 Drawing Sheets

PANEL BOARD EMERGENCY LIGHTING SYSTEM

CROSS-REFERENCE TO RELATED APPLICATIONS

This is a continuation of U.S. patent application Ser. No. 12/399,052, filed Mar. 6, 2009, entitled "Panel Board Emergency Lighting System," which claims the benefit of U.S. Provisional Patent Application No. 61/099,238, filed Sep. 23, 2008, also entitled "Panel Board Emergency Lighting System," the entire disclosures of each hereby incorporated by reference herein for all purposes.

TECHNICAL FIELD

The present invention relates generally to an emergency lighting system.

BACKGROUND ART

There has been an increasing demand for remotely controllable circuit breakers that can reciprocate between an open circuit and a closed circuit in response to a remotely generated command. One advantageous application for such circuit breakers is in the control panel boards that are used for automated control systems such as automated lighting systems. Automated lighting systems have been developed for the control of lighting circuits based upon inputs such as the time-of-day, wall switches, occupancy sensors and/or control from a power distribution system. Lighting control systems offer an opportunity to save energy by automating the process reducing the number of lighting fixtures that are illuminated, or by ceasing artificial lighting altogether when circumstances warrant. For example, ambient light sensors can be used to control lighting circuits in response to ambient light levels. The sensors can serve both switching and automatic dimming functions that can adjust the output of the lighting system continuously in response to the amount of daylight striking the ambient light sensor. Occupancy sensors can be used to activate lighting when someone is in a space and to deactivate the lighting, perhaps after a set time interval, when a person is no longer detected in the space. Using such a system, occupants no longer have to remember to turn the lights off when leaving the space. Automated control systems may require a remotely controllable circuit breaker, or relay. It is desirable that such circuit breakers have a low cost and high reliability.

Standard three-phase electric panel boards are offered in various sizes, the most common of which, but not limited to, are 18 circuits, 30 circuits, and 42 circuits. These standard electric panel boards typically have a phase layout in the order of A-Phase, B-Phase, C-Phase, A-Phase, B-Phase, C-Phase, etc. The order of the phase layout starts from the top continues to the bottom, starting from A-Phase and ending at C-Phase. An example of a normal phase layout for a panel having 18 circuits is: A, B, C, A, B, C, A, B, C.

All electrical lighting must comply with the National Electric Codes (NEC). For example, the provisions of NEC Section 700 apply to electrical safety of the installation, operation and maintenance of emergency systems consisting of circuits and equipment intended to supply, distribute, and control electricity for illumination or power, or both to required facilities when the normal electrical supply or system is interrupted. NEC code Section 700.12 specifically applies to emergency lighting. NEC code Section 700.12 states that the current supply of electricity shall be such that, in the event of failure of the normal supply of electricity to or within the structure concerned, emergency lighting, emergency power, or both shall be available within the time required for the application but not to exceed a time delay of 10 seconds. NEC code Section 700.12 further states that in a separate and uninterrupted area supplied by a minimum of three normal lighting circuits, a separate branch circuit for unit equipment shall be permitted if it originates from the same panel board as that of the normal lighting circuits and is provided with a lock-on feature.

Circuit breaker panels are also used to protect electrical circuitry from damage due to an over-current condition, such as an overload, a relatively high level short circuit, or a ground fault condition. In order to perform that function, circuit breaker panels include circuit breakers that typically contain a switch unit and a trip unit. The switch unit is coupled to the electrical circuitry (i.e., lines and loads) such that it can open or close the electrical path of the electrical circuitry. The switch unit includes a pair of separable contacts per phase, a pivoting contact arm per phase, an operating mechanism, and an operating handle. In the over-current condition, all the pairs of separable contacts are disengaged or tripped, opening the electrical circuitry. When the over-current condition is no longer present, the circuit breaker can be reset such that all the pairs of separable contacts are engaged, closing the electrical circuitry. In addition to manual over-current protection via the operating handle, automatic over-current protection is also provided via the trip unit. The trip unit, coupled to the switch unit, senses the electrical circuitry for the over-current condition and automatically trips the circuit breaker. When the over-current condition is sensed, a tripping mechanism included in the trip unit actuates the operating mechanism, thereby disengaging the first contact from the second contact for each phase. Typically, the operating handle is coupled to the operating mechanism such that when the tripping mechanism actuates the operating mechanism to separate the contacts, the operating handle also moves to a tripped position.

The general terms "switchgear and switchboard" are used to refer to electrical equipment including metal enclosures that house switching and interrupting devices such as fuses, circuit breakers and relays, along with associated control, instrumentation and metering devices. The enclosures typically include devices such as bus bars, inner connections and supporting structures (generally referred to herein as "panels") used for the distribution of electrical power. Such electrical equipment can be maintained in a building such as a factory or commercial establishment, or it can be maintained outside of such facilities and exposed to environmental weather conditions. Typically, hinge doors or covers are provided on the front of the switchgear or switchboard sections for access to the devices contained therein. In addition to electrical distribution and the protection of circuitry from over-current conditions, components have been added to panels for the control of electrical power supplied to loads connected to circuit breakers. For example, components have been used to control electrical power for lighting. One system used for controlling electrical power to loads utilizes a remote-operated circuit breaker system. In such a system, the switch unit of the circuit breaker operates not only in response to an over-current condition, but also in response to a signal received from a control unit separate from the circuit breaker. The circuit breaker is specially constructed for use as a remote-operated circuit breaker, and contains a motor for actuating the switch unit.

In an exemplary remote-operated circuit breaker system, a control unit is installed on the panel and is hard-wired to the remote-operated circuit breaker through a control bus. When the switch unit of the circuit breaker is to be closed or opened, an operating current is applied to or removed from the circuit breaker motor directly by the control panel. Additional, separate conductors are provided in the bus for feedback information such as contact confirmation, etc., for each circuit breaker position in the panel. The control unit contains electronics for separately applying and removing the operating current to the circuit breakers installed in particular circuit breaker positions in the panel. The panel control unit also has electronics for checking the state of the circuit breaker, diagnostics, etc. One advantage of that system is that the individual circuit breakers can be addressed according to their positions in the panel. Operation of remote operated circuit breakers requires a means to receive command signals to open or close, report back successful operation or device status, and drive opening and closing of switch mechanism contacts. In order to meet these requirements most efficiently, electronic circuitry is required. Typically, this circuitry is external to the switching device, due to component size and amount of power required. Locating communication and driver circuitry outside the switching device necessitates that the circuitry always be present in the panel board even if the switching device is not.

U.S. Pat. No. 6,034,581 (DiMarco, et al.), the entire disclosure of which is incorporated herein by reference, discloses a contact assembly 22 which is adapted for use with a circuit breaker 12 that is set to open a circuit above a predetermined current load. The contact assembly 22 is adapted to reciprocate between a closed position to permit the flow of current through the circuit and an open position to prevent the flow of current. The contact assembly 22 is further adapted to resist unintended reciprocation from the closed position to the open position at current loads up to or exceeding the predetermined current load. The contact assembly includes a line side conductor 38 and a load side conductor 54. When in the closed position, a surface 42 of the line side conductor 38 extends proximal to a surface 56 of the load side conductor 54 and current flows in substantially the same direction along the line side and load side surfaces 42 and 56 to generate an electromagnetic attraction between the conductors 38 and 54 in order to resist unintended reciprocation of the contact assembly 22 from the closed position to the open position due to inherent repulsion forces present across the contact points (contact constriction forces). U.S. Pat. No. 6,034,581 also describes a circuit breaker assembly 10 and an automated control system 300.

U.S. Patent Publication No. 20080084644 (William A. King), the entire disclosure of which is incorporated herein by reference, discloses an electrical distribution system for selectively connecting an electrical power source to load devices comprising a panel board having a plurality of load circuit positions. A remote operated device is mountable in the panel board comprising a load control device, and a device control for controlling the load control device. The device control comprises a programmed controller for operating the load control device responsive to control commands and a communication circuit for receiving control commands. An input/output (I/O) controller is mounted in the panel board for controlling operation of the remote operated device. The I/O controller comprises a programmed controller for generating the control commands for commanding operation of the remote operated device. The control system includes a communication circuit for communication with the remote operated device communication circuit.

There are commercially available emergency light fixtures that combine normal lighting and emergency lighting in one fixture. These light fixtures require two separate AC power inputs from the electrical panel board. A first AC input is for the normal lighting, which may require a remotely controlled circuit breaker or relay. A second AC input is for the emergency lighting. This second AC input provides power for charging the internal battery located in the fixture, and for powering the fixture's internal control circuits that sense loss of power from the electrical panel board and activate the emergency lighting circuits powered by the internal battery.

What is needed is a panel board emergency lighting system that overcomes the aforesaid problems of the prior art.

DISCLOSURE OF THE INVENTION

One purpose of the present invention is to provide an electrical power distribution panel that overcomes the problems and deficiencies of the prior art electrical power distribution panels.

Another purpose of the present invention is to provide a low cost and high reliability remotely controllable circuit breaker.

A further purpose of the present invention is to provide a remotely operated device that includes internal intelligence in an electrical power distribution system.

One feature of the present invention is that it can be configured for use with an automated control system.

Thus, the present invention is directed, in one aspect, to an emergency lighting system comprising an electrical panel board comprising a phase layout comprising a plurality of consecutively arranged phases wherein a pair of consecutive phases are of the same phase, a 2-pole branch circuit breaker electrically connected to the pair of consecutive phases that are of the same phase, and a 1-pole remotely-operated-relay electrically connected to one pole of the 2-pole branch circuit breaker. The emergency lighting system further comprises an emergency lighting fixture comprising a normal power input electrically connected to the load side of the 1-pole remotely-operated-relay such that the normal power input is connected to one phase of the plurality of phases, an emergency power input electrically connected to the load side of the 2-pole branch circuit breaker such that the emergency power input is electrically connected to the two consecutive phases of the same phase, and a neutral power input. The emergency lighting fixture further comprises a battery electrically connected to the emergency power input.

In another aspect, the present invention is directed to an electrical panel board comprising a phase layout comprising a plurality of consecutively arranged phases comprising at least one pair of consecutive phases that are of a first phase, a 2-pole branch circuit breaker electrically connected to the pair of consecutive phases that are of the first phase, and a 1-pole remotely-operated-relay electrically connected to one pole of the 2-pole branch circuit breaker. In another embodiment of the electrical panel board, the plurality of consecutively arranged phases further comprises a pair of consecutive phases that are of a second phase that is different than the first phase, and an additional 2-pole branch circuit breaker is electrically connected to the pair of consecutive phases that are of the second phase, and an additional 1-pole remotely-operated-relay that is electrically connected to one pole of the additional 2-pole branch circuit breaker.

Advantages, features and other purposes of the present invention are described in the ensuing description.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which.

BEST MODE FOR CARRYING OUT THE INVENTION

Figure 1:
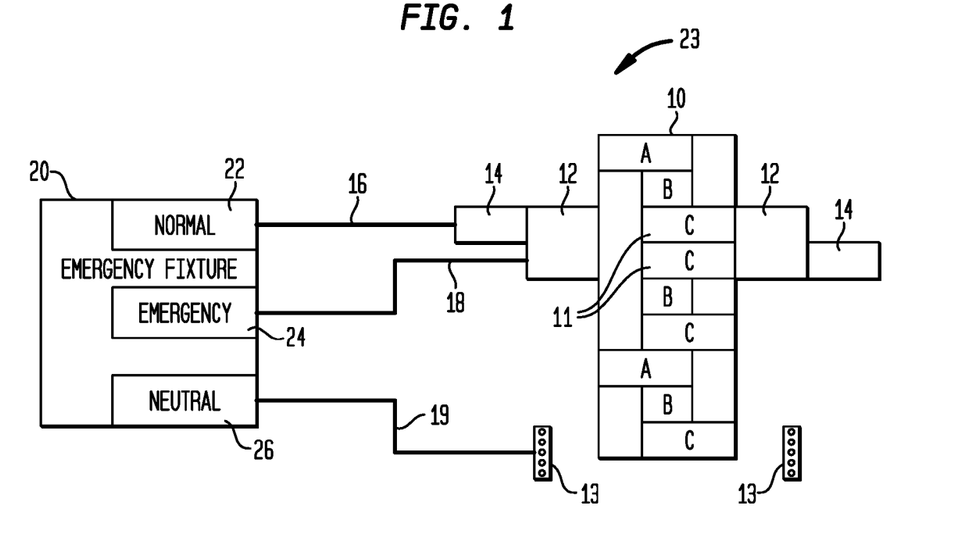
FIG. 1 is a block diagram of an emergency lighting system in accordance with one embodiment of the invention.
Figure 4A:
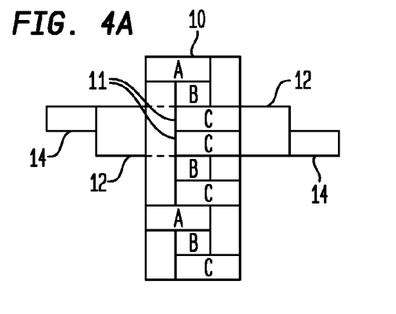
FIG. 4A is a block diagram of the electrical panel board shown in FIG. 1, the electrical panel board having two emergency circuits with a total of eighteen circuits overall.
Figure 4B:
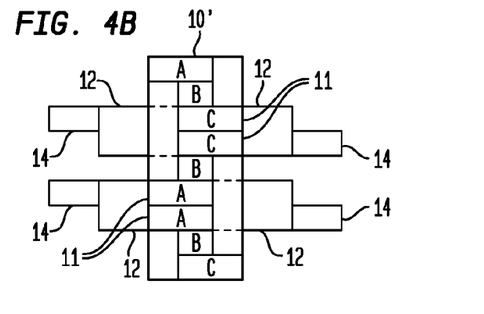
FIG. 4B is a block diagram of an alternate electrical panel board which can be used in the emergency lighting system shown in FIG. 1, the alternate electrical panel board having four emergency circuits with a total of eighteen circuits overall.

Referring to FIG. 1, there is shown emergency lighting system 23 of the present invention. Emergency lighting system 23 comprises electrical panel board 10 and emergency fixture 20. Electrical panel board 10 is shown in FIGS. 1 and 4A. Electrical panel board 10 has two emergency circuits, with a total of eighteen circuits overall. Electrical panel board 10 is electrically connected to emergency fixture 20 via controlled normal lighting line 16, which is connected to the normal power input 22, and non-controlled emergency line 18 that is connected to emergency input 24. Neutral power line 19 is connected between neutral connection 13 of electrical panel board 10 and neutral connection 26 of emergency fixture 20. For purposes of illustration only, electrical panel board 10 is shown having 18 circuits. FIG. 4B shows alternate electrical panel board 10' that can be used in place of electrical panel board 10 in emergency lighting system 23. Electrical panel board 10' has four emergency circuits, with a total of eighteen circuits overall.

As described in the foregoing description, commercially available electrical panel boards typically have a phase layout in the order of A-Phase, B-Phase, C-Phase, A-Phase, B-Phase, C-Phase, . . . etc. starting from the top to the bottom, and starting from A-Phase and ending at C-Phase. An example for the normal phase layout for an eighteen circuit panel would be A, B, C, A, B, C, A, B, C. However, in accordance with the invention, electrical panel board 10 is configured so that any two phases are consecutive. For example, as shown in FIG. 1, the phase change layout is A, B, C, C, B, C, A, B, C and in this case, two "C" phases 11 are consecutive.

In accordance with the invention, a 2-pole branch BQD circuit breaker 12 is connected to the two consecutive phases that have the same phase. Thus, the aforesaid 2-pole branch circuit breaker can be connected to the same phases such as A-A, B-B, or C-C. As shown in FIG. 1, 2-pole branch BQD circuit breaker 12 is connected to the C-C phase combination.

Referring to FIG. 1, a 1-pole remotely-operated-relay (ROR) 14 is electrically connected to one pole of the 2-pole BQD circuit breaker 12. Remotely-operated-relays, or "ROR", are known in the art and used in i-3 Control Technology, also known as ILC (Integrated Lighting Control). A remotely-operated-relay allows remote switching of an electrical branch load and is configured to fit inside a standard electrical panel board with up to forty-two branch circuit breakers. A remotely-operated-relay also functions as an accessory to a branch circuit breaker allowing repetitive switching of the load without affecting operation of the circuit protection device. Commercially available remotely-operated-relay devices are available in a 1-pole, and a 2-pole configuration.

Figure 2:
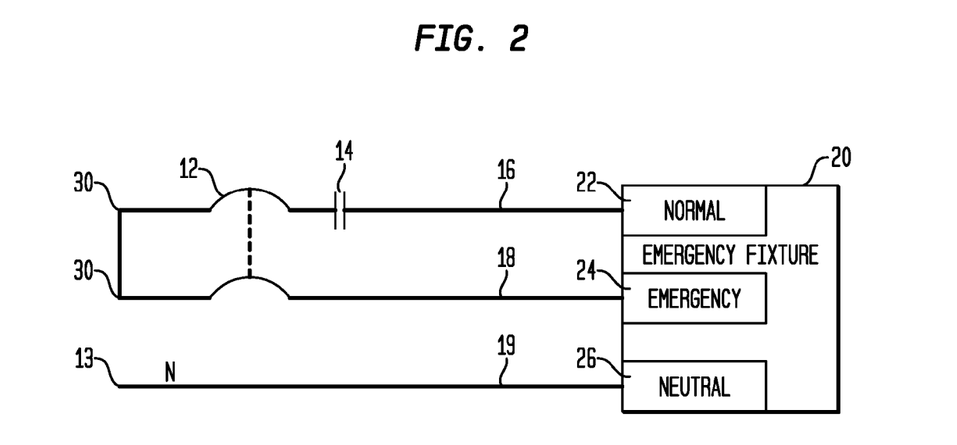
FIG. 2 is a schematic diagram illustrating a branch wiring using the emergency lighting system of FIG. 1.

Referring to FIGS. 1 and 2, in order to provide normal as well as emergency lighting, controlled line 16 is electrically connected between the 1-pole remotely-operated-relay 14 and normal lighting input or inverter 22 of emergency lighting fixture or ballast 20, and non-controlled line 18 is electrically connected between the 2-pole BQD circuit breaker 12 and the internal battery or emergency input 24 of emergency lighting fixture 20. FIG. 2 is a schematic diagram that illustrates a branch wiring of the emergency lighting system 23 shown in FIG. 1. Emergency lighting fixture 20 is wired in such a way that controlled line wire 16 is connected to the load side of the 1-pole remotely-operated-relay 14, and non-controlled line wire 18 is connected to the load side of the 2-pole BQD 12. The 2-pole BQD circuit breaker 12 is then connected to the two consecutive phases that are of the same phase 30 (e.g. C phase-C phase).

Figure 3:
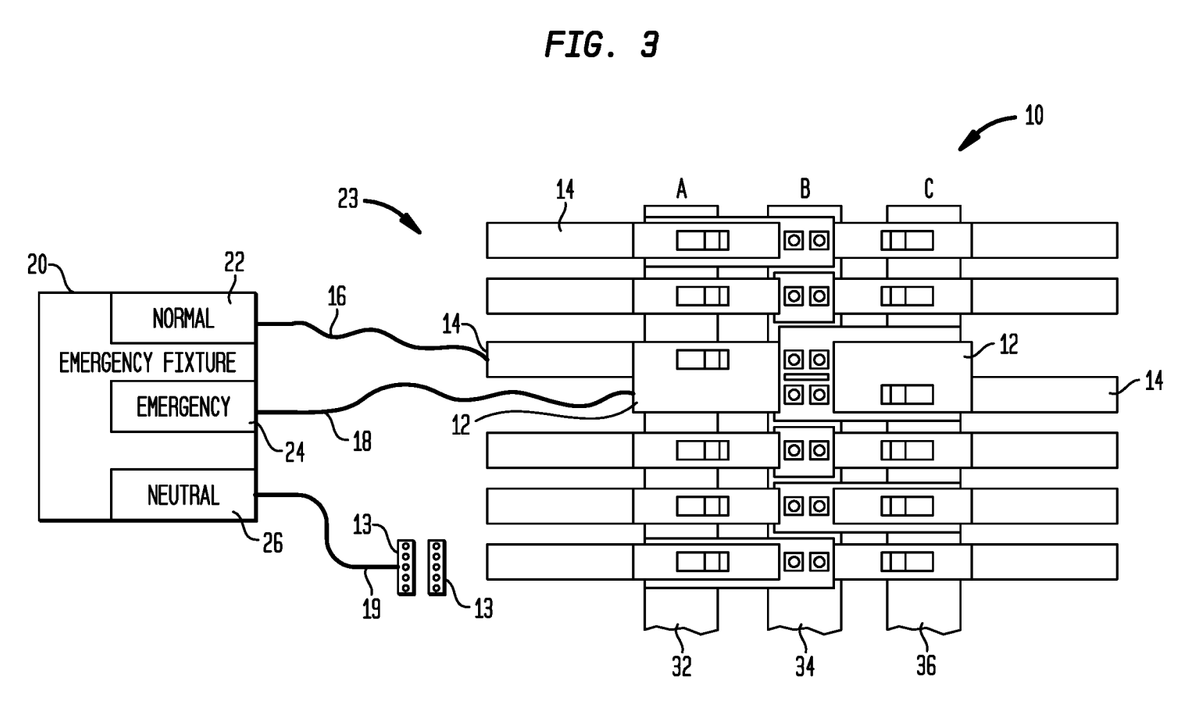
FIG. 3 illustrates a typical connection for an emergency lighting component using the emergency lighting system of FIG. 1.

Referring to FIG. 3, there is shown emergency lighting fixture 20 electrically connected to electrical panel board 10 which has A-phase 32, B-phase 34, and C-phase 36. Controlled line wire 16 connects remotely-operated-relay 14 to normal input 22 of emergency fixture 20 and non-controlled line wire 18 connects one pole of 2-pole BQD circuit breaker 12 and emergency input 24 of emergency fixture 20. For purposes of simplifying the diagram, neutral wire 19 is not shown.

Electrical panel board 10 may be modified to have different numbers of emergency circuits and overall circuits. Such embodiments are shown in FIGS. 5A, 5B, 5C, 5D, 6A, 6B, 6C, 6D, 6E and 6F.

Figure 5A:
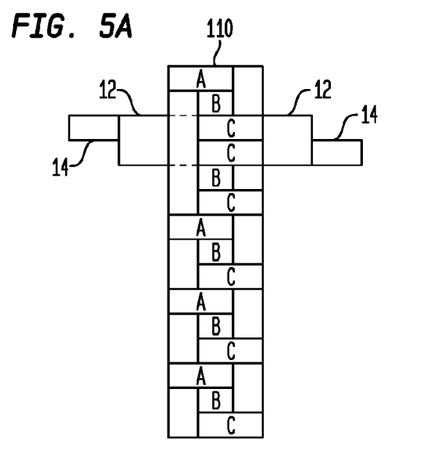
FIG. 5A is a block diagram of an electrical panel board in accordance with another embodiment of the invention, the electrical panel board having two emergency circuits with a total of thirty circuits overall.
Figure 5B:
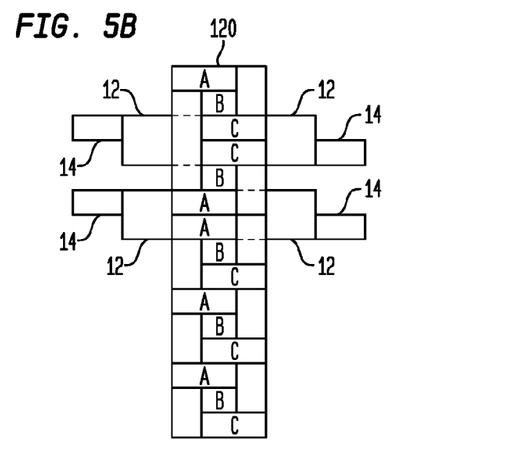
FIG. 5B is a block diagram of an electrical panel board in accordance with a further embodiment of the invention, the electrical panel board having four emergency circuits with a total of thirty circuits overall.
Figure 5C:
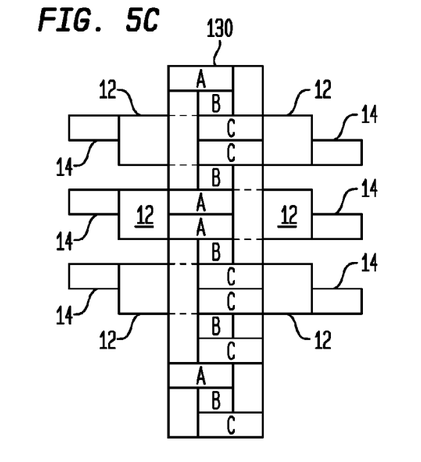
FIG. 5C is a block diagram of an electrical panel board in accordance with a further embodiment of the invention, the electrical panel board having six emergency circuits with a total of thirty circuits overall.
Figure 5D:
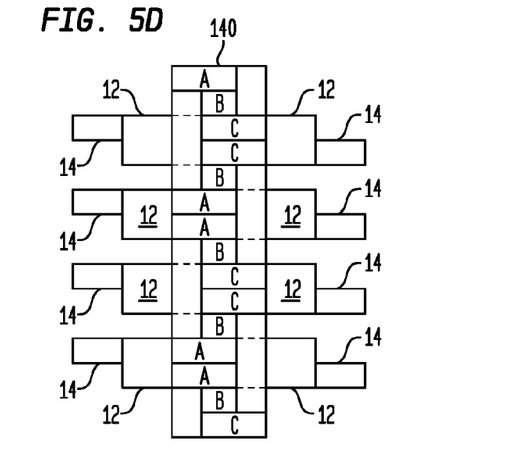
FIG. 5D is a block diagram of an electrical panel board in accordance with a further embodiment of the invention, the electrical panel board having eight emergency circuits with a total of thirty circuits overall.

FIG. 5A is a block diagram of alternate electrical panel board 110 which is configured to have two emergency circuits and total of thirty circuits overall. FIG. 5B is a block diagram of alternate electrical panel board 120 which has four emergency circuits and a total of thirty circuits overall. FIG. 5C is a block diagram of an electrical panel board 130 in accordance with a further embodiment of the invention. In this embodiment, electrical panel board 130 has six emergency circuits with a total of thirty circuits overall. FIG. 5D is a block diagram of an electrical panel board 140 in accordance with another embodiment of the invention. Electrical panel board 140 has eight emergency circuits with a total of thirty circuits overall.

Figure 6A:
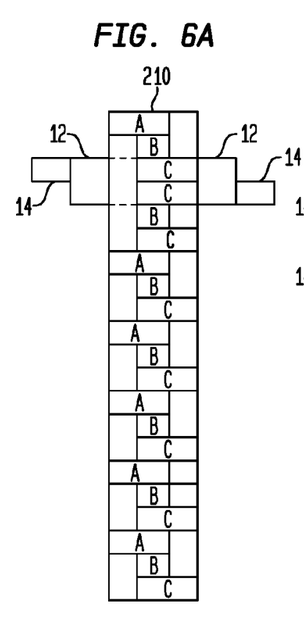
FIG. 6A is a block diagram of an electrical panel board in accordance with yet another embodiment of the invention.
Figure 6B:
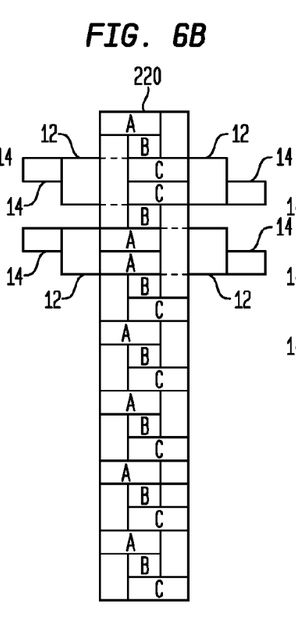
FIG. 6B is a block diagram of an electrical panel board in accordance with a further embodiment of the invention.
Figure 6C:
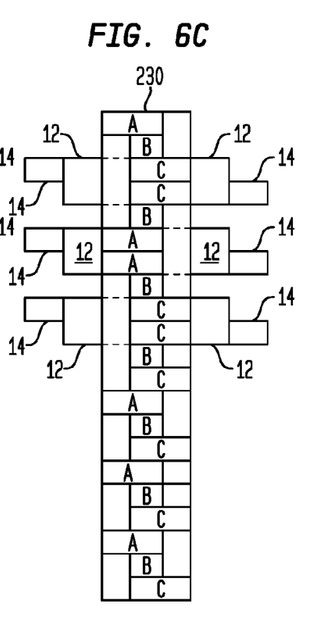
FIG. 6C is a block diagram of an electrical panel board in accordance with yet another embodiment of the invention.
Figure 6D:
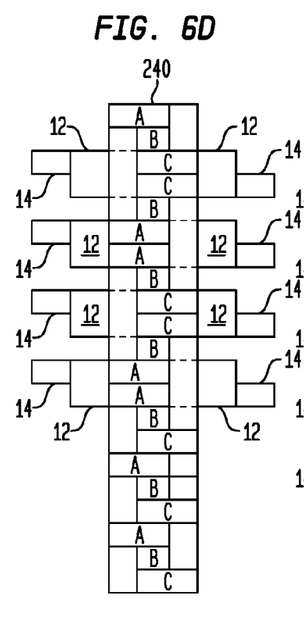
FIG. 6D is a block diagram of an electrical panel board in accordance with still another embodiment of the invention.
Figure 6E:
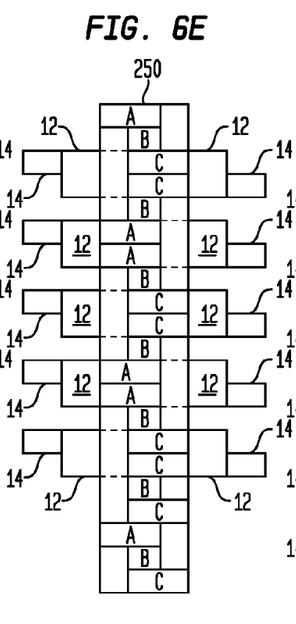
FIG. 6E is a block diagram of an electrical panel board in accordance with a further embodiment of the invention.
Figure 6F:
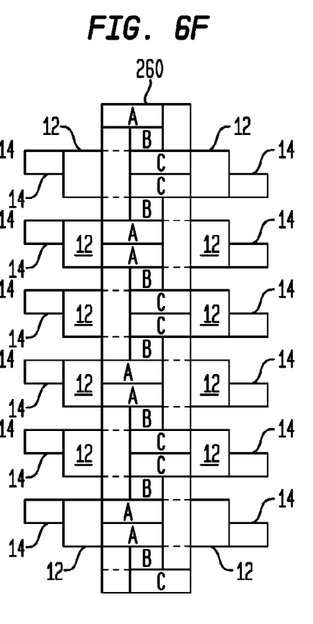
FIG. 6F is a block diagram of an electrical panel board in accordance with yet another embodiment of the invention.

FIG. 6A is a block diagram of alternate electrical panel board 210 which has two emergency circuits and a total of forty two circuits overall. FIG. 6B is a block diagram of alternate electrical panel board 220 which has four emergency circuits and a total of forty two circuits overall. FIG. 6C is a block diagram of alternate electrical panel board 230 which has six emergency circuits and a total of forty two circuits overall. FIG. 6D is a block diagram of alternate electrical panel board 240 which has eight emergency circuits and a total of forty two circuits overall. FIG. 6E is a block diagram of alternate electrical panel board 250 which has ten emergency circuits and a total of forty two circuits overall. FIG. 6F is a block diagram of alternate electrical panel board 260 which has twelve emergency circuits and a total of forty two circuits overall.

In an alternate embodiment, electrical panel board 10 is configured to use a remotely controlled circuit breaker in combination with an automated control device. Such an automated control system and remotely controlled circuit breaker are described in the aforesaid U.S. Pat. No. 6,034,581, the entire disclosure of which patent is hereby incorporated by reference.

Electrical panel board 10 may be used with any one of a variety of load devices, e.g. a relay, a circuit breaker, a current meter, a dimmer, and a magnetically held solenoid. If the load device comprises a magnetically held solenoid, then a sensing device can be used for sensing the position of the magnetically held solenoid. A status indicator device may also be electrically connected to electrical panel board 10. In yet a further embodiment, electrical panel board 10 is connected to a programmed controller that comprises at least one microcontroller and associated memory. A suitable load device and programmed controller are described in the aforesaid U.S. Patent Application Publication Number 20080084644, the entire disclosure of which publication is hereby incorporated by reference.

As stated in the foregoing description, an electrical distribution system, such as an integrated lighting control system in accordance with the invention, allows a user to control power circuits used for lighting, as well as circuits for resistive heating or air conditioning, with a remote operated device including internal intelligence. The lighting control system may include on/off switching, dimming and metering. The electrical distribution system may be as generally described in United States Patent Application Publication No 20070064360 (John DeBoer, et al.), filed Sep. 12, 2006, the entire disclosure of which is hereby incorporated by reference.

Figure 7:
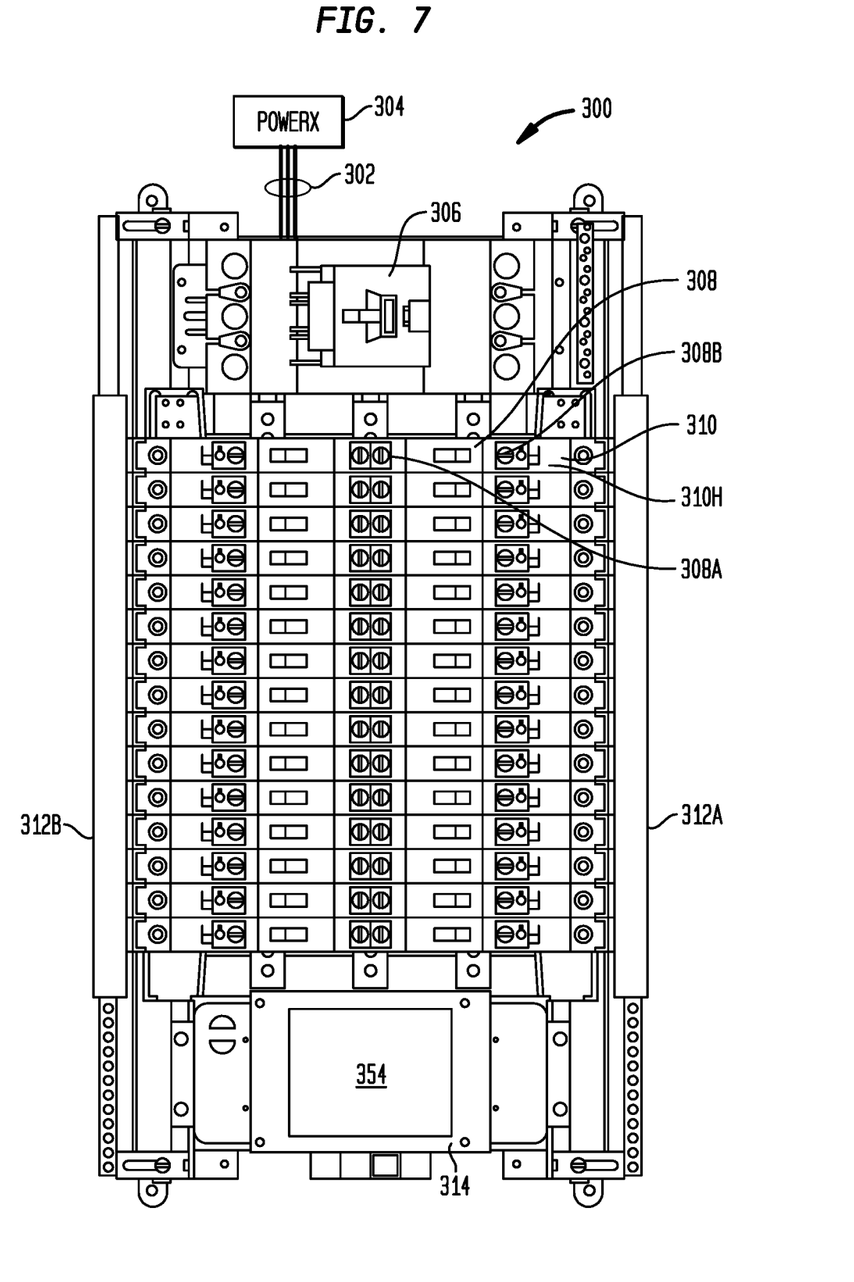
FIG. 7 is an elevation view of a power distribution panel according to the invention.

Referring now to FIG. 7, a lighting control system in accordance with one aspect of the invention comprises lighting control panel 300. In one embodiment, panel 300 comprises a Siemens type P1 panel board. However, it is to be understood that the Siemens type P1 panel board is just one example and that other suitable panel boards may be used. Line power enters panel 300 through power source cables 302 connected to a source of power 304. Line power may, for example, be a conventional three phase 480Y277, 240 or 120 VAC power source. Cables 302 are electrically connected to an input side of a main breaker 306. Main breaker 306 distributes line power to individual circuit breakers 308 in a conventional manner. How the power is distributed depends on design of the individual circuit breakers 308, as will be apparent to those skilled in the art. The power is distributed to the line side of individual circuit breakers 308. Panel 300 may be configured to accept up to forty-two individual circuit breakers 308, although only thirty are shown in the embodiment of FIG. 7. Each circuit breaker may be of conventional construction and may be, for example, a Siemens BQD circuit breaker. Each circuit breaker 308 includes a line terminal 308A receiving power from the main breaker 306 and a load terminal 308B conventionally used for connecting to a load circuit.

In accordance with the invention, each load circuit to be controlled also has a remote operated device 310, such as a relay, a meter or a dimmer. The term "remote operated device" as used herein includes any other devices that control, monitor or may otherwise be used in a load circuit, in accordance with the invention. While in a preferred embodiment, the remote operated device 310 is a separate component from the circuit breaker 308, the term "remote operated device" as used herein encompasses devices integral with the circuit breaker. The remote operated devices 310 are also connected to data rails 312A and 312B. Remote operated device 310 includes housing 310H that encases an auxiliary set of contacts that can be remotely operated to open and close a lighting circuit. Remote operated device 310 is attached to the load side of a circuit breaker 308 within panel 300 using a conductor tab, i.e., a terminal inserted into the breaker lug. Load terminal 308B comprises a lug of the same size as the breaker lug for connecting a wire to be connected to the load device. Housing 310H is configured to be mounted in a Siemens type P1 panel board, although the invention is not limited to such a configuration. Control panel 300 includes panel controller 314, and a user interface 354. Panel controller 314 controls remote operated devices 310 through connections provided via data rails 312A and 3128. Panel controller 314 further comprises an input/output (I/O) controller and optionally a system controller.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An emergency lighting system, comprising:
    a three-phase electric panel board having a first electrical phase layout section comprising A-B-C-C-B-A-A consecutively arranged electrical phases starting from a top of the three-phase electric panel board, wherein A represents a first electrical phase, B represents a second electrical phase, and C represents a third electrical phase; and
    a plurality of emergency circuits, wherein each of the emergency circuits comprises a 2-pole branch circuit breaker and a 1-pole remotely-operated-relay electrically connected to one pole of the 2-pole branch circuit breaker, the 2-pole branch circuit breaker having two voltage inputs, the plurality of emergency circuits comprising:
        first and second emergency circuits each having their respective 2-pole branch circuit breaker electrically connected to the C-C consecutively arranged electrical phases; and
        third and fourth emergency circuits each having their respective 2-pole branch circuit breaker electrically connected to the A-A consecutively arranged electrical phases.

2. The emergency lighting system of claim 1, wherein the three-phase electric panel board has a second electrical phase layout section comprising B-C-A-B-C-A-B-C consecutively arranged electrical phases immediately following the first electrical phase layout section, the three-phase electric panel board configured to support at least 26 circuits in addition to the first, second, third, and fourth emergency circuits.

3. The emergency lighting system of claim 1, wherein the three-phase electric panel board has a third electrical phase layout section comprising B-C-C-B-A-A-B-C consecutively arranged electrical phases immediately following the first electrical phase layout section.

4. The emergency lighting system of claim 3, wherein the plurality of emergency circuits further comprises:
    fifth and sixth emergency circuits each having their respective 2-pole branch circuit breaker electrically connected to the C-C consecutively arranged electrical phases of the third electrical phase layout section; and
    seventh and eighth emergency circuits each having their respective 2-pole branch circuit breaker electrically connected to the A-A consecutively arranged electrical phases of the third electrical phase layout section.

5. The emergency lighting system of claim 1, wherein the three-phase electric panel board has a fourth electrical phase layout section comprising B-C-C-B-C-A-B-C consecutively arranged electrical phases immediately following the first electrical phase layout section.

6. The emergency lighting system of claim 5, wherein the plurality of emergency circuits further comprises:
    ninth and tenth emergency circuits each having their respective 2-pole branch circuit breaker electrically connected to the C-C consecutively arranged electrical phases of the fourth electrical phase layout section.

7. The emergency lighting system of claim 1 further comprising an emergency lighting fixture comprising:
    a normal power input electrically connected to a load side of one of the 1-pole remotely-operated-relays such each of the normal power input is connected to one of the A or C electrical phases;
    an emergency power input electrically connected to a load side of one of the 2-pole branch circuit breakers to which the one of the 1-pole remotely-operated-relay is electrically connected such that the emergency power input is electrically connected to two consecutive C or two consecutive A electrical phases;
    a neutral power input; and
    a battery electrically connected to the emergency power input.

8. The emergency lighting system of claim 1 further comprising a data rail coupled to at least one of the 1-pole remotely-operated-relays.

9. The emergency lighting system of claim 8 further comprising a programmed controller coupled to the data rail, the programmed controller configured to operate the at least one 1-pole remotely-operated-relay.

10. An emergency lighting system, comprising:
    a three-phase electric panel board having an electrical phase layout comprising a repeating pattern of B-C-C-B-A-A electrical phases wherein A represents a first electrical phase, B represents a second electrical phase, and C represents a third electrical phase; and
    a plurality of emergency circuits, wherein each of the emergency circuits comprises a 2-pole branch circuit breaker and a 1-pole remotely-operated-relay electrically connected to one pole of the 2-pole branch circuit breaker, the 2-pole branch circuit breaker having two voltage inputs, each of the 2-pole branch circuit breakers electrically connected to an A-A or C-C pair of consecutively arranged electrical phases.

11. The emergency lighting system of claim 10 wherein the repeating pattern of B-C-C-B-A-A electrical phases repeats twice, a first repeating pattern of B-C-C-B-A-A electrical phases immediately following a second repeating pattern of B-C-C-B-A-A electrical phases.

12. The emergency lighting system of claim 10 further comprising a plurality of emergency lighting fixtures, wherein each emergency lighting fixture is coupled to a respective 1-pole remotely-operated-relay and 2-pole branch circuit breaker electrically connected to the respective 1-pole remotely-operated-relay.

13. The emergency lighting system of claim 10 further comprising a plurality of non-emergency circuits, wherein each non-emergency circuit is coupled to a respective B electrical phase.

14. A method of installing an emergency lighting system, comprising:
    arranging a first electrical phase layout section of a three-phase electric panel board to have A-B-C-C-B-A-A consecutively arranged electrical phases starting from a top of the three-phase electric panel board, wherein A represents a first electrical phase, B represents a second electrical phase, and C represents a third electrical phase; and
    installing a plurality of emergency circuits in the three-phase electric panel board, wherein each of the emergency circuits comprises a 2-pole branch circuit breaker and a 1-pole remotely-operated-relay electrically connected to one pole of the 2-pole branch circuit breaker, the 2-pole branch circuit breaker having two voltage inputs, the installing comprising:
        electrically connecting a respective 2-pole branch circuit breaker of first and second emergency circuits to the C-C consecutively arranged electrical phases; and
        electrically connecting a respective 2-pole branch circuit breaker of third and fourth emergency circuits to the A-A consecutively arranged electrical phases.

15. The method of claim 14 further comprising installing a data rail in the three-phase electric panel board, wherein the date rail is electrically connected to at least one of the 1-pole remotely-operated-relays.

16. The method of claim 15 further comprising installing a programmed controller in the three-phase electric panel board, the programmed controller coupled to the data rail.

17. The method of claim 14 further comprising programming a programmed controller to operate the at least one 1-pole remotely-operated-relay.

18. The method of claim 14 further comprising arranging a second electrical phase layout section having B-C-A-B-C-A-B-C consecutively arranged electrical phases immediately following the first electrical phase layout section, the three-phase electric panel board configured to support at least 26 circuits in addition to the first, second, third, and fourth emergency circuits.

19. The method of claim 14 further comprising arranging a third electrical phase layout section having B-C-C-B-A-A-B-C consecutively arranged electrical phases immediately following the first electrical phase layout section, the three-phase electric panel board configured to support at least 26 circuits in addition to the first, second, third, and fourth emergency circuits.

20. The method of claim 19 wherein the installing further comprises:
   electrically connecting a respective 2-pole branch circuit breaker of fifth and sixth emergency circuits to the C-C consecutively arranged electrical phases of the third electrical phase layout section; and
   electrically connecting a respective 2-pole branch circuit breaker of seventh and eighth emergency circuits to the A-A consecutively arranged electrical phases of the third electrical phase layout section.

* * * * *